(12) United States Patent
Lundqvist et al.

(10) Patent No.: US 11,724,952 B2
(45) Date of Patent: *Aug. 15, 2023

(54) METHOD AND SYSTEM FOR HYDROTHERMAL CARBONIZATION AND WET OXIDATION OF SLUDGE

(71) Applicant: C-Green Technology AB, Solna (SE)

(72) Inventors: Fredrik Lundqvist, Ekero (SE); Erik Oden, Stocksund (SE); Fredrik Ohman, Gavle (SE)

(73) Assignee: C-Green Technology AB, Solna (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/295,017

(22) PCT Filed: Nov. 22, 2019

(86) PCT No.: PCT/SE2019/051187
§ 371 (c)(1),
(2) Date: May 18, 2021

(87) PCT Pub. No.: WO2020/112007
PCT Pub. Date: Jun. 4, 2020

(65) Prior Publication Data
US 2022/0002176 A1    Jan. 6, 2022

(30) Foreign Application Priority Data
Nov. 26, 2018  (SE) .................... 1851461-2

(51) Int. Cl.
*C02F 9/00*     (2023.01)
*C10L 5/48*     (2006.01)
(Continued)

(52) U.S. Cl.
CPC ............... *C02F 9/00* (2013.01); *C10L 5/48* (2013.01); *C10L 9/086* (2013.01); *C02F 1/06* (2013.01);
(Continued)

(58) Field of Classification Search
CPC .... C02F 9/00; C02F 1/06; C02F 11/08; C02F 11/10; C02F 11/18; C02F 2209/02;
(Continued)

(56) References Cited

U.S. PATENT DOCUMENTS 10,836,666 B2 * 11/2020 Lundqvist ............... C10L 9/086
2012/0103040 A1   5/2012 Wolf et al.
(Continued)

FOREIGN PATENT DOCUMENTS

DE   102010062833 B3   6/2012
EP     2206688 A1 *   7/2010 ............ C02F 11/083
(Continued)

OTHER PUBLICATIONS

Baskyr, et al., Wet oxidation of char-water-slurries from hydrothermal carbonization of paper and brewer's spent grains, Fuel Processing Technology 128 (2014) 425-431.
(Continued)

*Primary Examiner* — Cephia D Toomer
(74) *Attorney, Agent, or Firm* — Stites & Harbison PLLC; Richard S. Myers, Jr.

(57) ABSTRACT

There is provided a method of hydrothermal carbonization of a sludge from a wastewater treatment plant, comprising the steps of: preheating the sludge with at least one first steam fraction to obtain a preheated sludge; further heating the preheated sludge with a second steam fraction to obtain a heated sludge; subjecting the heated sludge to hydrothermal carbonization (HTC) in a reactor to obtain a HTC-treated slurry; mixing the HTC-treated slurry with an oxi-
(Continued)

dizing agent, such as oxygen gas, to obtain a wet-oxidized slurry; subjecting the wet-oxidized slurry to flashing to obtain the second steam fraction and a pre-cooled slurry; subjecting the pre-cooled slurry to flashing in at least one step to obtain the at least one first steam fraction and a cooled slurry; separating the cooled slurry into a liquid fraction and a solids fraction; and routing the liquid fraction to the wastewater treatment plant for further treatment, wherein the second steam fraction is used for heating preheated sludge to the temperature of the HTC reaction. A corresponding system is also provided.

8 Claims, 1 Drawing Sheet

(51) Int. Cl.
  *C10L 9/08* (2006.01)
  *C02F 1/06* (2023.01)
  *C02F 11/08* (2006.01)
  *C02F 11/10* (2006.01)
  *C02F 11/18* (2006.01)

(52) U.S. Cl.
  CPC .............. *C02F 11/08* (2013.01); *C02F 11/10* (2013.01); *C02F 11/18* (2013.01); *C10L 2290/06* (2013.01)

(58) Field of Classification Search
  CPC .... C02F 2209/44; C02F 2303/10; C10L 5/48; C10L 9/086; C10L 2290/06; Y02W 10/40; Y02W 10/30
  See application file for complete search history.

(56) References Cited

U.S. PATENT DOCUMENTS

| | | | |
|---|---|---|---|
| 2017/0197588 A1* | 7/2017 | Flick | B60R 25/10 |
| 2017/0197858 A1* | 7/2017 | Pardo | F23G 7/001 |
| 2018/0194657 A1 | 7/2018 | Ohman | |

FOREIGN PATENT DOCUMENTS

| | | | | |
|---|---|---|---|---|
| EP | 2206688 A1 | 7/2010 | | |
| WO | WO2009127727 A1 | 10/2009 | | |
| WO | WO-2017003358 A1 * | 1/2017 | ............ | B01J 19/244 |
| WO | WO2017003358 A1 | 1/2017 | | |
| WO | WO-2017146635 A1 * | 8/2017 | | |
| WO | WO-2017222462 A1 * | 12/2017 | .............. | C02F 11/08 |
| WO | WO2017222462 A1 | 12/2017 | | |

OTHER PUBLICATIONS

Riedel, et al: Combination of hydrothermal carbonization and wet oxidation of various biomasses, Chemical Engineering Journal 279 (2015) pp. 715-724.
Reza et al: Wet air oxidation of hydrothermal carbonization (HTC) process liquid, ACS Sustainable Chem. Eng. 2016, 4, 3250-3254.
Weiner et al: Wet Oxidation of Process Waters from the Hydrothermal Carbonization of Sewage Sludge, Chemie Ingenieur Technik, 2018, 90, No. 6, 872-880.

* cited by examiner

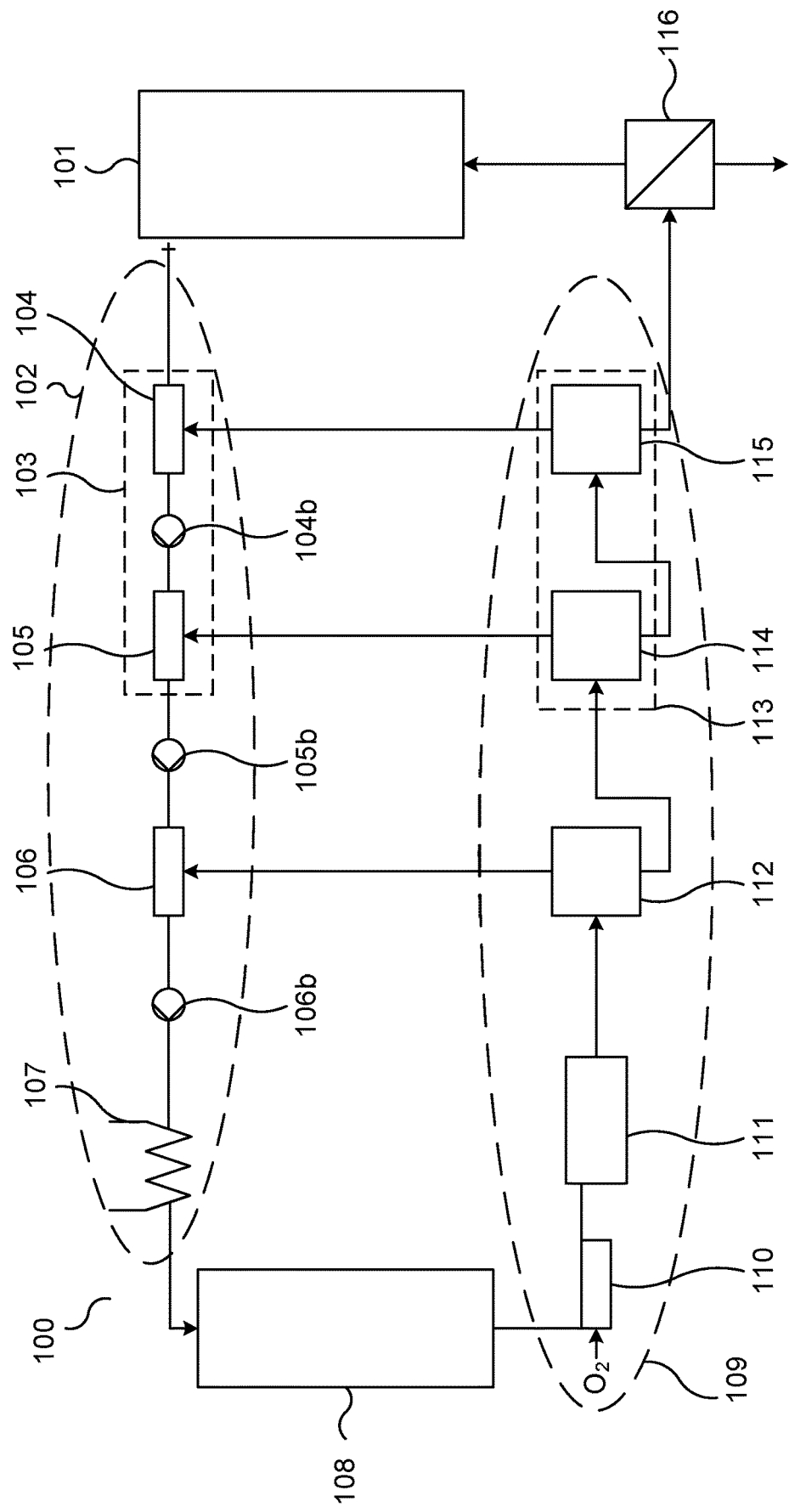

METHOD AND SYSTEM FOR HYDROTHERMAL CARBONIZATION AND WET OXIDATION OF SLUDGE

CROSS REFERENCE TO RELATED APPLICATIONS

This application is a § 371 National State Application of PCT/SE2019/051187 filed Nov. 22, 2019, which claims priority to SE 1851461-2 filed Nov. 26, 2018.

TECHNICAL FIELD

The present disclosure relates to a method of hydrothermal carbonization of sludge, in particular municipal or industrial sludge from a wastewater treatment plant.

BACKGROUND

Sludge is typically what remains after wastewater treatment in municipal or industrial wastewater treatment plants. Municipal wastewater treatment plants treat wastewater from cities while industrial wastewater treatment plants treat water effluents from different industrial processes, for example pulp and paper mills, industrial food production facilities etc. Animal farming is also a considerable source of wastewater and sludge, for example large-scale pig farming. Embodiments of the present disclosure will be useful in all these areas.

The technologies for wastewater treatment are similar on a general level, but include specific solutions depending on the character of the waste streams to be treated, basic design, local requirements and environmental concerns. In larger plants in Sweden, the wastewater treatment process often comprises mechanical pretreatment followed by primary (settling) and secondary (aerobic) treatment steps. In some cases different forms of tertiary treatment is also applied to remove remaining problematic substances, for example drug residues, toxic organic substances etc., in the treated water. In smaller plants one or more of these stages may often be omitted.

Almost all wastewater treatment plants in use generate sludge that needs to be handled. The sludge is either recovered directly from the plant after dewatering (aerobic sludge) or first treated anaerobically for biogas production where part of the sludge is digested and the remainder is recovered as anaerobic sludge.

Wastewater treatment plants world wide produce several hundred millions metric tonnes of sludge every year and the amount is rapidly growing. In Sweden, the total sludge volume in tons of dry solids per year (tDS/y) was reported to be 250 000 in 2010 and the current figure is estimated to be the same or higher. Sludge handling is thus an enormous challenge for society, and present solutions are associated with high cost and frequently also a negative environmental impact.

Starting from 1986, the European Union has adopted several directives regulating the treatment and disposal of waste water sludge, addressing different aspects such as the use of sludge as landfill, the recovery of phosphorus, incineration of sludge etc. The various directives are reflected in national legislation in the individual member states, and for example in Sweden, the disposal of sludge in landfill has been prohibited since 2005.

Today, the main uses for wastewater sludge are fertilization in agriculture and forestry/silviculture, mixing into plant soil for ground construction projects and the coverage and restoration of landfills, incineration with energy recovery, recovery of chemicals and the production of fertilizers, and finally landfill, however provided that the sludge has undergone specific pretreatment, such as composting.

Incineration of the sludge, with energy recovery and suitable treatment of flue gases and ashes to destroy harmful chemicals and safely handle heavy metals, remains an attractive alternative. The exact composition of the sludge however depends on the composition of the incoming wastewater and the type of wastewater treatment plant. Sludge with high concentrations of organic and/or biological components is generally difficult to dewater. The water content is frequently so high that the net heating value if incinerated in a power plant is very low or even negative and the addition of support fuels, often fossil fuel, may be necessary.

C-Green Technology AB has developed a process for treatment of sludge involving a step of hydrothermal carbonization (HTC).

SUMMARY

The operation of many hydrothermal carbonization (HTC) systems normally requires a supply of external energy, e.g. in the form of electricity or gas. The present inventors have found that the need for continuous supply of external energy in HTC treatment of sludge can be eliminated or at least significantly reduced by wet-oxidizing the product of the HTC treatment (i.e. a HTC-treated slurry) and then subjecting the wet-oxidized slurry to flashing to obtain a high-temperature steam fraction that can be used for heating untreated sludge to the temperature of the HTC reaction. Thereby, the heat released by the oxidation reactions is recovered and used in the process in an efficient way. Another benefit of carrying out wet-oxidation downstream the HTC treatment is that the HTC treatment increases the chemical oxygen demand (COD), which means that more fuel has been made available for the wet oxidation process. Further, the HTC-treated slurry has a higher temperature than incoming or preheated sludge and higher temperature results in a higher rate of the wet oxidation reactions, which are temperature-dependent. Compared to the concept disclosed in WO 2017/111462, the concept of the present disclosure is simplified, e.g. it allows for less complicated heat recovery.

As a first aspect of the present disclosure, there is thus provided a method of hydrothermal carbonization of a sludge from a wastewater treatment plant, comprising the steps of:
  preheating the sludge with at least one first steam fraction to obtain a preheated sludge;
  further heating the preheated sludge with a second steam fraction to obtain a heated sludge;
  subjecting the heated sludge to hydrothermal carbonization (HTC) in a reactor to obtain a HTC-treated slurry;
  mixing the HTC-treated slurry with an oxidizing agent, such as oxygen gas, to obtain a wet-oxidized slurry;
  subjecting the wet-oxidized slurry to flashing to obtain the second steam fraction and a pre-cooled slurry;
  subjecting the pre-cooled slurry to flashing in at least one step to obtain the at least one first steam fraction and a cooled slurry;
  separating the cooled slurry into a liquid fraction and a solids fraction; an
  routing the liquid fraction to the wastewater treatment plant for further treatment.

The wet oxidation of the above method results in that the COD of the liquid fraction is reduced, which decreases the load of any COD-reducing treatment (typically an anaerobic treatment) in the wastewater treatment plant. Further, the wet oxidation consumes particulate organic material, which reduces the volume of the solids fraction (that typically has to be transported to another site) and enriches the solids fraction in phosphorus and other ash components.

The oxidizing agent is preferably oxygen gas. "Oxygen gas" refers to a gas comprising at least 80% oxygen by volume, preferably at least 95% oxygen by volume. Consequently, "adding oxygen gas" in step b) does not cover adding air (as the oxygen content of air is only 21% by volume). A benefit of using oxygen gas instead of air is that less inert gas is added to the reactor. Another benefit is a more efficient wet oxidation reaction As understood by the skilled person, the method is a continuous method.

The sludge of the present disclosure is preferably a municipal or industrial sludge from a wastewater treatment plant.

The pre-cooled slurry may be subjected to flashing in at least two steps to obtain at least two first steam fractions of different temperatures. These at least two first steam fractions are preferably used for sequential heating of the sludge in the preheating step. In one embodiment, the pre-cooled slurry is subjected to flashing in at least three steps (e.g. three or four steps) to obtain at least three first steam fractions (e.g. three or four first steam fractions) of different temperatures, which are preferably used for sequential heating of the sludge in the preheating step.

The dry solids content (also referred to as "Total Solids") of the sludge is typically 1-35%, such as 2-35%, such as 3-32%. If the sludge is anaerobic sludge, the dry solids content is normally 13-32%. If the sludge is aerobic sludge, the dry solids content is typically 5-15%. The ash content is typically 10-75%, such as 12-50%, such as 30-50%, of the dry weight of the sludge. The higher heating value (HHV) of the sludge is typically 3.5-21 MJ/kg, such as 6-17 MJ/kg (dry weight).

The wet oxidation of the present disclosure typically does not use the whole energy content of the slurry. It may for example reduce the heat content HTC-treated slurry by 5-50%, preferably 5-25%, more preferably 9-16%. The amount of oxidation agent added in the method may be adapted accordingly. The heat content may be measured by a bomb calorimeter.

The HTC treatment has only a minor effect on the heat content of the sludge. Consequently, 50-95%, such as 75-95%, such as 84-91% of the heat content of the untreated sludge typically remains after the wet oxidation.

The present disclosure facilitates the separation of phosphorus (P). Accordingly, the sludge of the present disclosure may comprise phosphorus, e.g. in an amount of 0.5-9% of the dry weight of the sludge, such as 1-9% of the dry weight of the sludge, such as 1.5-9% of the dry weight of the sludge.

The sludge of the present disclosure preferably comprises carbon (C), e.g. in an amount of 9-46% of the dry weight of the sludge, such as 20-46% of the dry weight of the sludge.

To obtain sufficient time for the wet oxidation reaction, the mixture of HTC-treated slurry and the oxidizing agent may be retained in a reactor for a period of time. The retention time in such a reactor may for example be 5-40 min, such as 5-20 min. The volume of such a reactor may for example be 5-30%, such as 5-20% of the volume of the reactor for the HTC.

The oxidizing agent may be added directly to such a reactor. In such case the reactor may be a counter- or concurrent flow reactor or an absorption tower. It may however be more preferred to add the oxidizing agent to the HTC-treated slurry upstream the reactor for the wet oxidation reactions, e.g. using a gas mixer.

When the oxidizing agent is oxygen gas, it may be added in an amount of 60-260 kg per tonne of dry sludge processed by the method, preferably 100-200 kg per tonne of dry sludge processed by the method, more preferably 110-150 kg per tonne of dry sludge processed by the method.

The average retention time in the reactor is typically 0.25-8 h and preferably 0.5-2 h.

The chemical oxygen demand (COD) of the HTC-treated slurry is typically at least 30 g/l, preferably 30-50 g/l, more preferably 35-45 g/l.

The temperature of the HTC-treated slurry is typically 180-250° C. and preferably 180-230° C. More preferably, it is 190-225° C.

The wet oxidation increases the temperature of the HTC-treated slurry. The temperature of the wet-oxidized slurry may for example be 220-260° C., preferably 230-250° C. and more preferably 235-245° C.

The temperature of the second steam fraction, which is the high-temperature steam fraction obtained by flashing the wet-oxidized slurry, may be 190-240° C., preferably 200-230° C. and more preferably 210-220° C.

This second steam fraction raises the temperature of the preheated sludge. The step of further heating the preheated sludge, in which the second steam fraction is used, may for example result in a temperature increase of at least 10° C. (e.g. 10-50° C.), preferably at least 15° C. (e.g. 15-50° C.), more preferably at least 20° C. (e.g. 20-50° C.), such as at least 25° C. (e.g. 25-50° C.).

The temperature of the second steam fraction is typically 9-40° C. higher than the temperature of the heated sludge. Preferably, it is 10-35° C. higher, such as 10-30° C. higher, such as 10-21° C. higher.

Further, the temperature of the second steam fraction is typically 25-75° C. higher than the temperature of the preheated sludge. Preferably, it is 30-70° C. higher, more preferably 40-60° C. higher.

Further embodiments of the first aspect may be derived from the discussion about the second aspect below.

As a second aspect of the present disclosure, there is provided a system for hydrothermal carbonization (HTC) of a sludge from a wastewater treatment plant, comprising:
- a reactor for subjecting sludge to a HTC such that HTC-treated slurry is obtained (HTC reactor);
- a separating arrangement for separating wet-oxidized and cooled slurry into a liquid fraction and a solids fraction;
- a sludge routing arrangement for routing sludge to the HTC reactor, which sludge routing arrangement comprises a preheating arrangement and a further heating arrangement, wherein the further heating arrangement is arranged downstream the preheating arrangement; and
- a slurry routing arrangement for routing HTC-treated slurry from the HTC reactor to the separating arrangement, which slurry routing arrangement comprises a mixer for mixing the HTC-treated slurry with an oxidizing agent and a first and a second flashing arrangement, wherein the mixer is arranged upstream the first flashing arrangement and the second flashing arrangement is arranged downstream the first flashing arrangement;
- a first steam routing arrangement for routing steam from the first flashing arrangement to the further heating arrangement;

a second steam routing arrangement for routing steam from the second flashing arrangement to the preheating arrangement; and a liquid fraction routing arrangement for routing the liquid fraction from the separating arrangement to the wastewater treatment plant.

As understood by the skilled person, the system is adapted for a continuous process and the HTC reactor is a continuous reactor.

The oxidizing agent is preferably oxygen gas and the mixer is preferably an oxygen gas mixer. Other types of oxidizing equipment, such as counter- or concurrent flow reactors or absorption towers can also be used.

To provide time for the wet oxidation reactions, the slurry routing arrangement may comprise a second reactor arranged between the mixer and the first flashing arrangement. The mixer may also be part of a second reactor.

As less time is typically needed for the wet oxidation reactions than for the HTC process, the volume of the second reactor may be 5-30%, such as 5-20%, of the volume of the HTC reactor.

The second flashing arrangement may comprise at least two, such as at least three, flashing vessels arranged in series to provide steam fractions of different temperatures. Further, the preheating arrangement may comprise at least two, such as at least three, steam mixers arranged in series. The second steam routing arrangement preferably connects the flashing vessels to the steam mixers such that the sludge can be preheated stepwise.

The steam mixer(s) may be venturi mixer(s).

Otherwise, the embodiments of the first aspect apply to the second aspect mutatis mutandis.

BRIEF DESCRIPTION OF THE DRAWINGS

FIG. 1 illustrate an exemplary embodiment of a system for sludge treatment according to the present disclosure.

DETAILED DESCRIPTION

An exemplary embodiment of a system 100 according to the present disclosure is schematically illustrated in FIG. 1. A sludge is received from a wastewater treatment plant 101. The sludge may be received directly from the plant 101 or from a storage tank (not shown) that forms part of the system 100. The sludge typically has an initial temperature of about 30° C. and a dry matter content of about 30%. After optional initial heating (not shown), the sludge is preheated in a preheating arrangement 103. The preheating is preferably carried out by stepwise additions of steam, e.g. in a first 104 and a second 105 steam mixer arranged in series. Downstream each steam mixer 104, 105, a pump 104P, 105P is arranged. After the preheating arrangement 103, a preheated sludge having a temperature of about 175° C. is obtained. The preheated sludge is heated further in a further heating arrangement 106, which is typically a steam mixer and after which a pump 106p is arranged. The further heated sludge is fed to a reactor 108, in which the sludge undergoes hydrothermal carbonization (HTC). An HTC-treated slurry, which typically has a temperature of 200-215° C. is withdrawn from the reactor 108. The pressure of the HTC-treated slurry is slightly increased a pump (not shown). Oxygen gas is then added to the HTC-treated slurry in an oxygen gas mixer 110. The oxygen gas mixer is connected to a pressurized oxygen tank (not shown). The amount of oxygen gas may be about 250 kg per tonne of dry sludge processed in the system 100. The wet oxidation is not instantaneous. Rather, it will be ongoing when the fraction flows downstream the oxygen gas mixer 110. To allow time for the exothermic wet oxidation reactions, a second reactor 111 may therefore be arranged downstream the oxygen gas mixer 110. The wet-oxidized slurry obtained from the second reactor 111 typically has a temperature of about 240° C. and is led to a first flashing arrangement 112 producing a high-temperature steam fraction having a temperature of about 220° C. and a pre-cooled slurry. The high-temperature steam fraction is routed to the further heating arrangement 106 and is thus used to heat the preheated sludge.

The pre-cooled slurry is subjected to flashing in a second flashing arrangement 113, which produces at least one steam fraction that is used to preheat the sludge in the preheating arrangement 103. Preferably, the flashing arrangement 113 comprises several flashing vessels arranged in series to produce steam fractions of different temperatures. For example, the flashing arrangement 113 may comprise: a first flashing vessel 114 that produces a steam fraction of "medium" temperature that is routed to the second steam mixer 105 of the preheating arrangement 103; and a second flashing vessel 115 that produces a steam fraction of relatively low temperature that is routed to the first steam mixer 104 of the preheating arrangement 103.

The cooled slurry obtained downstream the second flashing arrangement 113 is separated by a separating arrangement 116 into a liquid stream that is routed back to the wastewater treatment plant 101 for further treatment and a solids fraction that has been enriched in ash components, such as phosphorous, by the upstream wet oxidation process.

The system 100 may comprise a heater 107 using external heat, such as an electrical heater, for cold-starting the process. The heater 107 is preferably arranged downstream the further heating arrangement 106, but upstream the reactor 108.

The preheating arrangement 103, the further heating arrangement 106, the associated pumps and the heater 107 forms part of a sludge routing arrangement 102 for routing sludge to the reactor 108.

The oxygen gas mixer 110, the second reactor 111, the first flashing arrangement 112 and the second flashing arrangement 113 forms part of a slurry routing arrangement 109 for routing HTC-treated slurry from the reactor 108 to the separating arrangement 116.

The invention claimed is:

1. A method of hydrothermal carbonization of a sludge from a wastewater treatment plant, comprising the steps of:

preheating the sludge with at least one first steam fraction to obtain a preheated sludge;

further heating the preheated sludge with a second steam fraction to obtain a heated sludge;

subjecting the heated sludge to hydrothermal carbonization (HTC) in a reactor to obtain a HTC-treated slurry, wherein the temperature of the HTC-treated slurry is 180-250° C.;

mixing the HTC-treated slurry with an oxidizing agent to obtain a wet-oxidized slurry, wherein the temperature of the wet-oxidized slurry is 220-260° C.;

subjecting the wet-oxidized slurry to flashing to obtain the second steam fraction and a pre-cooled slurry;

subjecting the pre-cooled slurry to flashing in at least one step to obtain the at least one first steam fraction and a cooled slurry;

separating the cooled slurry into a liquid fraction and a solids fraction; and routing the liquid fraction to the wastewater treatment plant for further treatment, wherein the second steam fraction is used for heating preheated sludge to the temperature of the HTC reaction.

2. The method according to claim 1, wherein the temperature of the second steam fraction is 190-240° C.

3. The method according to claim 1, wherein the step of further heating the preheated sludge results in a temperature increase of at least 10° C.

4. The method according to claim 1, wherein the temperature of the second steam fraction is 9-40° C. higher than the temperature of the heated sludge.

5. The method according to claim 1, wherein the temperature of the second steam fraction is 25-75° C. higher than the temperature of the preheated sludge.

6. The method according to claim 1, wherein the sludge is a municipal or industrial sludge.

7. The method according to claim 1, wherein the pre-cooled slurry is subjected to flashing in at least two steps to obtain at least two first steam fractions of different temperatures, which are used for sequential heating of the sludge in the preheating step.

8. The method according to claim 1, wherein the residence time between the step of mixing the HTC-treated slurry with the oxidizing agent and the step of subjecting the wet-oxidized slurry to flashing is 5-75 min.

\* \* \* \* \*